(12) United States Patent
Emerson

(10) Patent No.: US 6,446,409 B1
(45) Date of Patent: Sep. 10, 2002

(54) STRUCTURAL BRACKET FOR SECURING SPANNING AND SUPPORTING MEMBERS

(75) Inventor: Nicholas W. Emerson, Portland, OR (US)

(73) Assignee: Full Circle Industries, Inc., Portland, OR (US)

( * ) Notice: Subject to any disclaimer, the term of this patent is extended or adjusted under 35 U.S.C. 154(b) by 0 days.

(21) Appl. No.: 09/688,058

(22) Filed: Oct. 13, 2000

Related U.S. Application Data

(60) Provisional application No. 60/159,198, filed on Oct. 13, 1999.

(51) Int. Cl.[7] .................................................. E04B 1/38
(52) U.S. Cl. ............................ 52/712; 52/714; 52/715; 403/232.1
(58) Field of Search .......................... 52/712–715, 702; 403/232.1

(56) References Cited

U.S. PATENT DOCUMENTS

| | | | |
|---|---|---|---|
| 2,704,868 A | 3/1955 | Danielson | |
| 3,188,696 A | 6/1965 | Earhart | |
| 3,256,030 A | 6/1966 | Banse | |
| 3,972,169 A | 8/1976 | Sheppard, Jr. | |
| 4,455,805 A | 6/1984 | Rionda et al. | |
| 4,498,801 A | 2/1985 | Gilb | |
| 4,517,776 A | 5/1985 | Barker | |
| 4,555,887 A | 12/1985 | Rionda et al. | |
| 4,620,403 A | 11/1986 | Field | |
| 4,656,794 A | 4/1987 | Thevenin et al. | |
| 4,841,690 A | 6/1989 | Commins | |
| 4,920,713 A | 5/1990 | Borresen et al. | |
| 4,932,173 A | 6/1990 | Commins | |
| 4,965,980 A | 10/1990 | Leavens | |
| 5,027,573 A | 7/1991 | Commins et al. | |
| 5,186,571 A | 2/1993 | Hentzschel | |
| 5,217,317 A | 6/1993 | Young | |
| 5,403,110 A | 4/1995 | Sammann | |
| 5,437,132 A | 8/1995 | Meyers | |
| 5,457,928 A | 10/1995 | Sahnazarian | |
| 5,560,156 A | * 10/1996 | McDonald | 52/92.2 |
| 5,564,248 A | 10/1996 | Callies | |
| 5,598,680 A | 2/1997 | Wilhelmi | |
| 5,625,995 A | 5/1997 | Martin | |
| 5,836,131 A | 11/1998 | Viola et al. | |
| 6,295,780 B1 | * 10/2001 | Thompson | 52/712 |
| 6,295,781 B1 | * 10/2001 | Thompson | 52/712 |

\* cited by examiner

Primary Examiner—Beth A. Stephan

(57) ABSTRACT

A flanged bracket is used with fasteners to attach at least one spanning member to at least one supporting member extending transverse to the spanning member. The bracket has a first flange, a second flange and a third flange. The second flange extends approximately perpendicular from the first flange. The third flange extends approximately perpendicular from the second flange. With a side of the spanning member touching a supporting face of the transverse supporting member, the bracket is positionable such that the first flange can be attached to a side of the supporting member, and the third flange can be attached to a face of the spanning member. The second flange extends between the first and third flanges in a plane approximately parallel to a contact area between the spanning member and the supporting member.

18 Claims, 5 Drawing Sheets

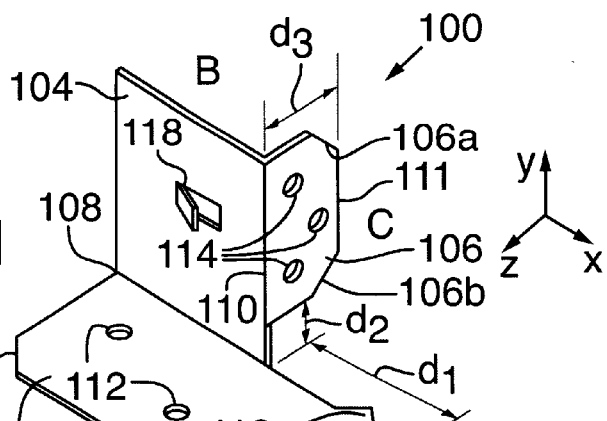
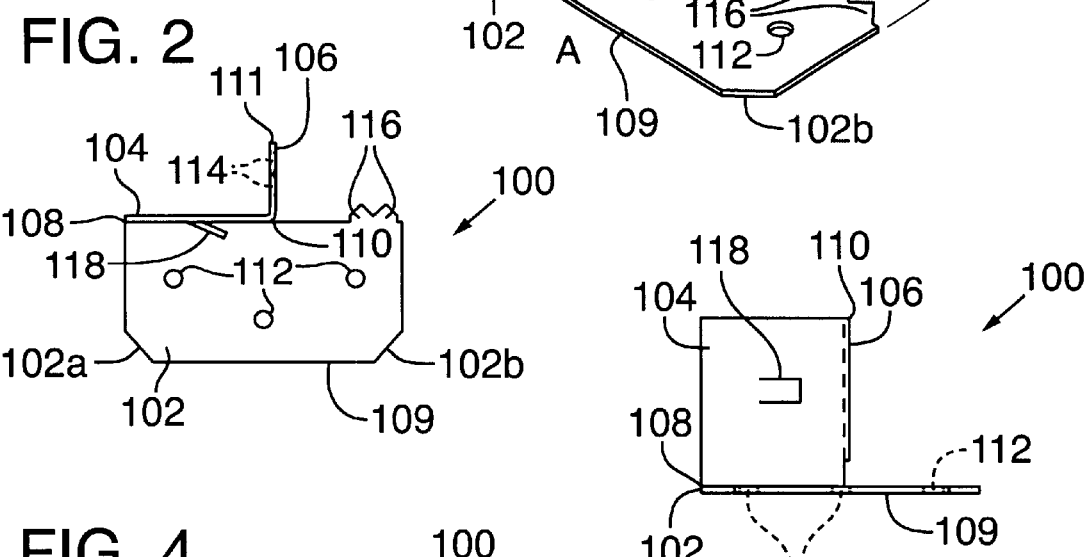
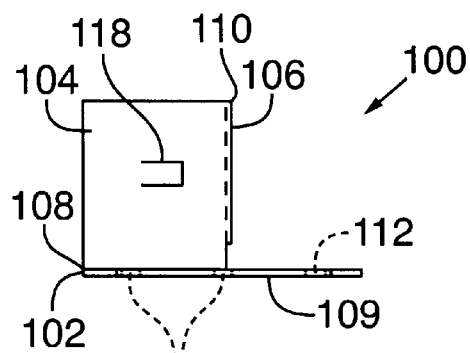
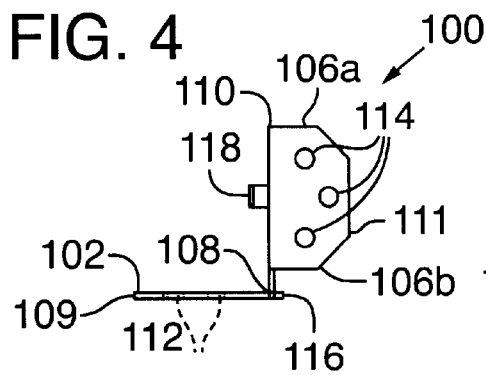
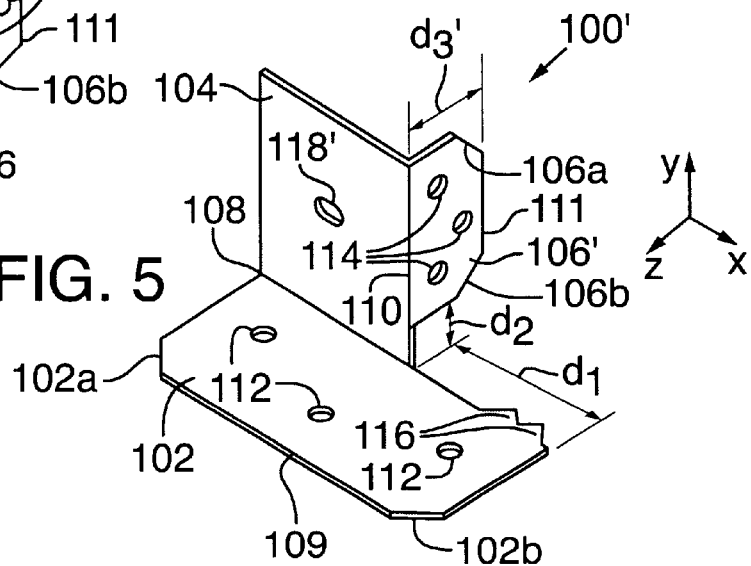

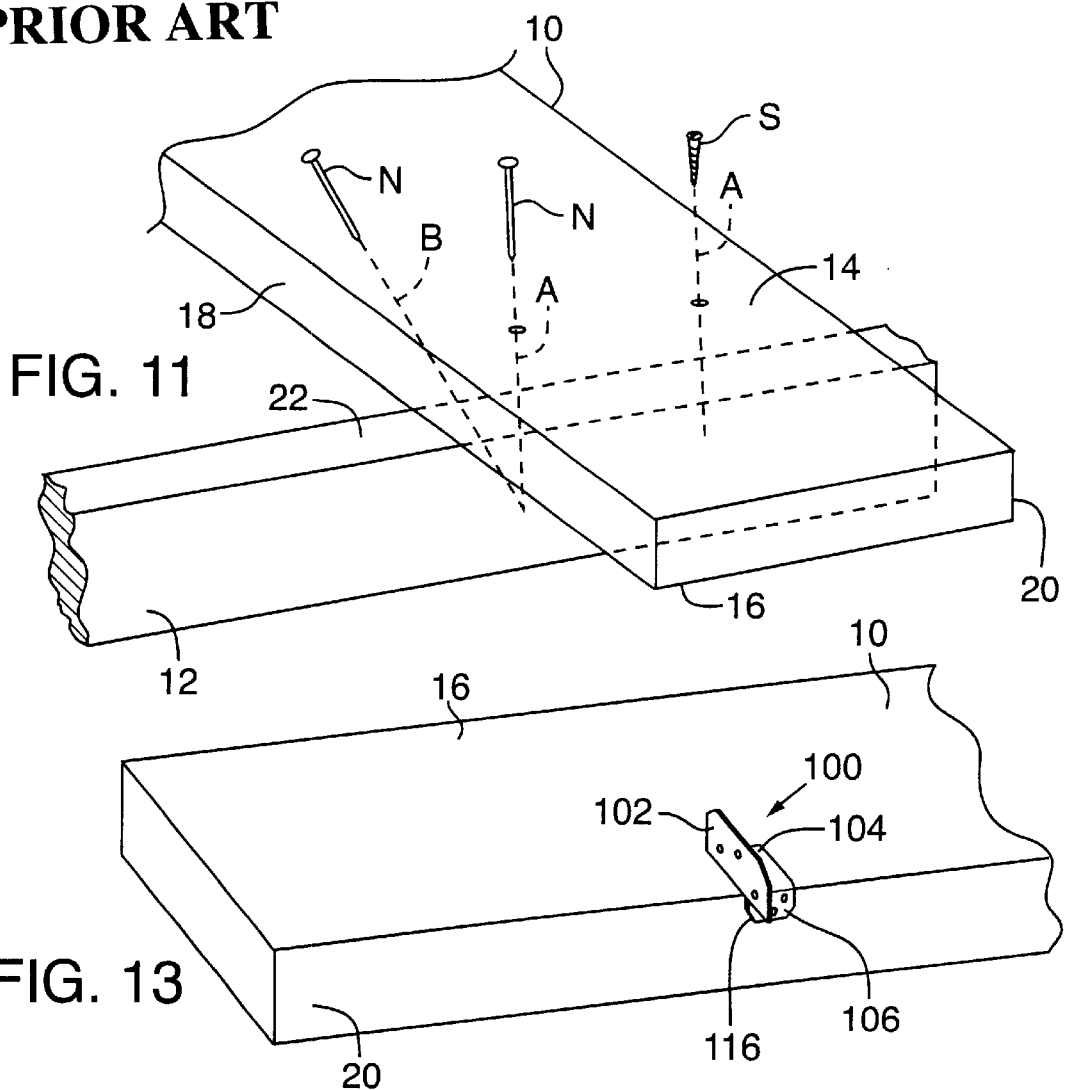

US 6,446,409 B1

STRUCTURAL BRACKET FOR SECURING SPANNING AND SUPPORTING MEMBERS

RELATED APPLICATION DATA

This application claims the benefit of U.S. Provisional application No. 60/159,198, filed Oct. 13, 1999.

FIELD

The present invention relates to a bracket used in assembling component pieces of a structure, in which one or more spaced supporting members (e.g., stringers or joists) and transversely oriented spanning members (e.g., boards, planks or slats) are attached together.

BACKGROUND

Decks, board walks, stair systems, benches, tables, fences and other similar structures that have a flat, approximately level surface formed from a number of spanning members laid adjacent each other over an array of spaced apart supporting members (or stringers) are well known. These types of structures enjoy wide appeal because they can be made in various configurations from standard-sized lumber and are relatively inexpensive and easy to construct.

In constructing a deck, for example, one typical problem is attaching the decking boards, which are the generally horizontal spanning members making up the flooring or finished surface, to the underlying joists or stringers, which are oriented on edge. Referring to an end of a deck board 20 as shown in FIG. 11, the pair of surfaces in the cross section having the narrower dimension are referred to as "faces," whereas the other pair of surfaces are referred to as "sides." Thus, as illustrated in FIG. 11, a side of the deck board 10 (i.e., the spanning member) is supported on an upper face 22 of a joist or stringer 12. The deck board 10 is conventionally attached to the stringer 12 using nails or screws. If screws are used, each screw S is driven through both an upper side surface 14 and a lower side surface 16 of the deck board 10 and into the upper face 22 of the stringer 12, as indicated by the dashed lines A. A nail N can also be driven through the deck board 10 and into the face 22 in the same way as the screw S.

In addition, the deck board 10 can be toe-nailed to the stringer 12 as indicated by the dashed line B. In toe-nailing, the nail N is driven through a face of the deck board 10, referred to here has the rear face 18, and into the upper face 22 of the stringer 12. A forward face 20, which is opposite the rear face 18, may also be toe-nailed, or may be secured by an adjacent board (not shown).

These conventional methods have several disadvantages. Screws or nails driven through the upper side of decking boards are easily seen and may detract from the overall aesthetic appearance of the deck surface. This condition is exacerbated when the screws or nails are subject to the direct effects of weather in outdoor decks, resulting in rust stains on the deck boards. Deck boards can be easily marred during construction due to hammering mistakes. Nails can back out above the surface of the upper side due to seasonal swelling and shrinkage of the wood or flexing of the deck board surface, resulting in a safety hazard.

During construction, consistent spacing between fasteners and between boards can be difficult to maintain. Proper toe-nailing can be difficult and time-consuming because the nails must be driven on an angle straight through the relatively thin face of the deck board to a sufficient depth so as not to protrude and interfere with an adjacent deck board. Even if carried out correctly, toe-nailing often results in cracked deck boards.

SUMMARY

The present invention minimizes many of the problems associated with using conventional fastening methods to attach a spanning member or board to a transverse (i.e., non-parallel) supporting member or stringer. In particular, the present invention is a flanged bracket that allows the spanning member to be fastened to the supporting member with screws or nails extending through the flanges and into the respective members. The same bracket can be used in an alternative configuration as a toe cleat when secured to a spanning member at a point between adjacent supporting members.

For purposes of convenience, the bracket is described herein with respect to construction of a horizontally oriented home deck structure. However, the bracket may also be used in the construction of other structures, e.g. in any application where attaching multiple spanning members or boards to one or more supporting members or stringers is desired.

The bracket eliminates nails and screws driven through the upper side surface of the deck board, which improves the overall aesthetic appearance of the deck. The bracket also eliminates toe-nailing, thus resulting in an easier, more consistent and faster way of attaching deck boards to stringers.

The bracket creates a better joint that is stronger and more resistant to torsional forces than conventional nailing practices. The bracket is held in place by screws or nails driven at right angles to the associated surfaces, which allows greater flexibility with regards to fastener installation (e.g., allowing the use of automated driving tools) and a more secure attachment. Additionally, all critical fastener connections are placed in shear rather than tension, eliminating direct nail pull out. As an added benefit, the brackets may help maintain consistent spacing between adjacent boards. Furthermore, when screws are used, disassembling the deck (e.g., to replace a board) may also be possible.

Deck stringer members are typically made from lumber in conventional sizes such as 2"×6", 2"×8", 2"×10", 2"×12", etc. which have a 2" nominal thickness and a finished thickness of about 1¾. Deck boards are commonly 1"–1.5" in finished thickness depending on structural specifications. The disclosed bracket may be used without modification with all such thicknesses, and can be used with virtually any size decking members with no structural shape changes.

According to specific implementations, the bracket has three flanges arranged on mutually exclusive planes. At least a first flange and a second flange, which are attached to each other, are mutually perpendicular. The third flange, which is attached to the second flange, is either perpendicular to each of the first flange and the second flange, or extends from the second flange at an acute angle (preferably about 45 degrees).

The first flange and the second flange may be attached to each other at a common edge. The first flange may be longer than the second flange in the direction of this common edge.

The second flange and the third flange may also be attached to each other at a common edge. The second flange may be longer than the third flange in the direction of this common edge.

The first and third flanges may extend in opposite directions from the second flange.

The first flange and the third flange may each have a plurality of apertures that are dimensioned to receive fasteners, such as screws or nails, to secure the flanges in place against a surface of the deck board or stringer. Alternatively, the first and third flanges can each have indicia to locate fasteners installed through the flanges by automatic driving devices (e.g. nail guns). The second flange has an attachment feature, which may be a push-out, an aperture, an indicator, or a similar structure, that similarly serves to secure the second flange against an adjacent surface of the deck board or stringer.

Specific implementations of the bracket can be used, without modification, in at least two configurations: (1) as a heel tie-down to secure a deck board to a stringer; or (2) as a toe cleat attached to a lower side of a first deck board at a point between two stringers and extending beyond a forward face of the first deck board to engage a lower side of a second, adjacent deck board, thereby serving to keep the first and second deck boards from cupping and/or warping. An edge of the first flange may include an engaging feature that assists in establishing engagement, particularly between the bracket and the second board when the bracket is used in the toe cleat configuration.

For a herringbone deck in which the deck boards run at an angle other than 90 degrees to the underlying stringers, the bracket is configured with the third flange extending at the same angle. Thus, the bracket ensures that the deck boards are installed at the correct angle (whether the angle is 90 degrees or a different angle), and that each deck board is installed consistent with the other deck boards.

DESCRIPTION OF THE DRAWINGS

FIG. 1 is a perspective view of a bracket according to a first embodiment of the invention.

FIG. 2 is a top view of the bracket of FIG. 1.

FIG. 3 is a front view of the bracket of FIG. 1.

FIG. 4 is a right side view of the bracket of FIG. 1.

FIG. 5 is a perspective view of a bracket according to a second embodiment of the invention.

FIG. 11 is a partial perspective view showing various conventional methods for attaching a board to a stringer.

FIG. 13 is a partial perspective view of an underside of a board on which the bracket has been installed in a toe cleat configuration.

DETAILED DESCRIPTION

Figure 6:
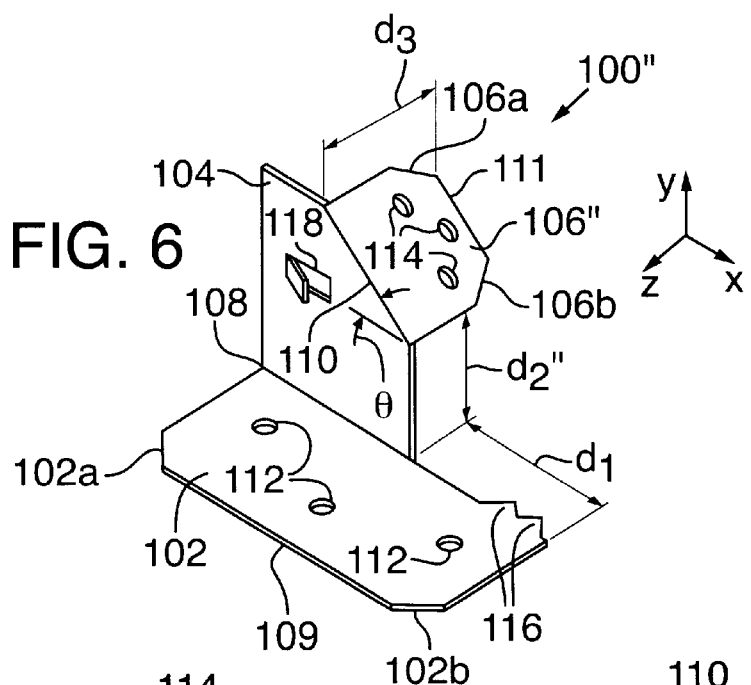
FIG. 6 is a perspective view of a bracket according to a third embodiment of the invention.
Figure 7:
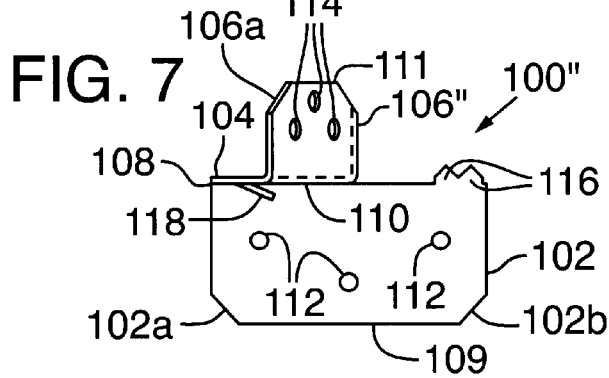
FIG. 7 is a top view of the bracket of FIG. 6.
Figure 8:
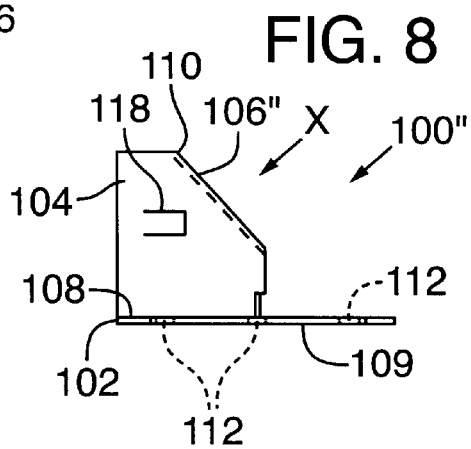
FIG. 8 is a front view of the bracket of FIG. 6.

As illustrated in FIGS. 1–4, a bracket 100 according to a first embodiment of the invention has three generally planar flanges that are mutually perpendicular to each other. Referring to FIG. 1, the bracket has an A flange 102 defining an x-z plane, a B flange 104 defining a x-y plane and a C flange 106 defining a y-z plane, according to the coordinate axes shown in the figure.

The B flange 104 is attached to the A flange 102 at an A/B intersection along an edge 108 of the A flange 102. The C flange 106 is attached to the B flange 104 at a B/C intersection along an edge 110 of the B flange 104.

The A flange 102 is generally rectangular and has an outer edge 109 opposite the edge 108. The outer edge 109 has beveled or rounded corners 102a, 102b. The A flange 102 includes a plurality of A apertures 112 or indicia. As illustrated, the A flange 102 is longer than the B flange 104 in the x direction. Thus, the edge 108 extends beyond the A/B intersection by a distance $d_1$ in the x direction.

The A flange 102 has one or more engagement features 116 positioned on the edge 108 along the portion of the edge 108 that extends beyond the A/B intersection. In the specific implementation of FIGS. 1–4, the engagement features 116 include at least two teeth that project beyond the edge 108. The teeth 116 engage, i.e., bite into, a side of an overlying board when the bracket 100 is utilized as a toe cleat, as described in more detail below.

Similar to the A flange 102, the B flange 104 is also generally rectangular. The B flange 104 has an attachment feature 118 that allows the B flange to be attached to an adjacent surface. In the specific implementation of FIGS. 1–4 (and also FIGS. 6–9), the attachment feature is a punch out. The punch out 118 projects at an angle from the B flange 104, but can be pounded or pressed into, e.g., a board against which the B flange 104 is placed to assist in holding the bracket 100 in place.

Figure 9:
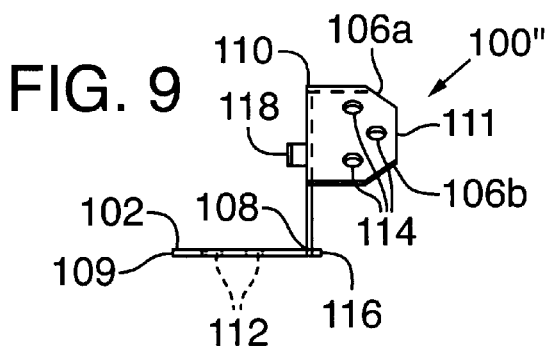
FIG. 9 is a right side view of the bracket of FIG. 6.
Figure 10:
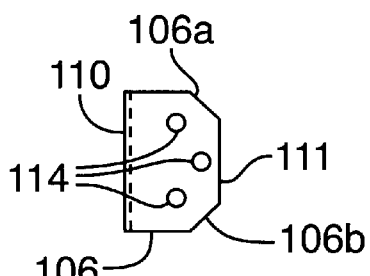
FIG. 10 is a top view of the C surface viewed from the direction X in FIG. 8.

Alternatively, the attachment feature 118 may be an aperture 118' as shown in FIG. 9, a plurality of apertures or other known structure for attaching the B flange 104 to an adjacent surface. As in the case of the A apertures 112 and the C apertures 114, the aperture 118' is dimensioned to receive a nail or screw suitable for securing the bracket 100 in place. The number and spacing of the A apertures 112, the C apertures 114 and the attachment feature 118, 118' can be varied to suit particular installation requirements.

The C flange 106 is generally rectangular and has an outer edge 111 opposite the edge 110 of the B flange 104. The outer edge 111 has beveled or rounded corners 106a, 106b. The C flange 106 includes a plurality of C apertures 114. As illustrated, the C flange 106 is shorter than the B flange 104 in the y direction. Thus, the B/C intersection is spaced along the edge 110 from the A/B intersection by a distance $d_2$ in the y direction. The C flange 106 extends from the B flange 104 in the z direction, and has a width equal to a distance $d_3$.

A bracket 100' according to a second embodiment is illustrated in FIG. 5. The bracket 100' is generally similar to the bracket 100, except as described below. First, as discussed above, the bracket 100' has a B flange with an aperture 118' instead of the punch out 118 of the first embodiment. Second, the C flange 106' of the bracket 100' has greater width than the C flange 106 of the first embodiment, i.e., the distance $d_{3'}$ is greater than the distance $d_3$. The C flange width is sized according to the width of the boards with which the bracket 100 will be used.

A bracket 100" according to a third embodiment is illustrated in FIGS. 6–10. The bracket 100" is generally similar to the bracket 100, except as described below. In the bracket 100", the C flange 106" extends from the B flange 104 at an acute angle θ. In the specific implementation shown in FIG. 6, the angle θ is approximately 45 degrees.

The bracket 100" is particularly suited for use in constructing structures in which the boards run at an acute angle with respect to the stringers (e.g. "herringbone" decks in which the deck boards are typically oriented 45 degrees with respect to the stringers).

As stated, the bracket 100 or the bracket 100' can be used in a heel tie-down configuration or in a toe cleat configuration, as desired. In the heel tie-down configuration, the A flange 102 and the C flange 106 are each secured to adjacent surfaces. In the toe cleat configuration, only the C flange 106 need be secured to an adjacent surface.

Figure 12A:
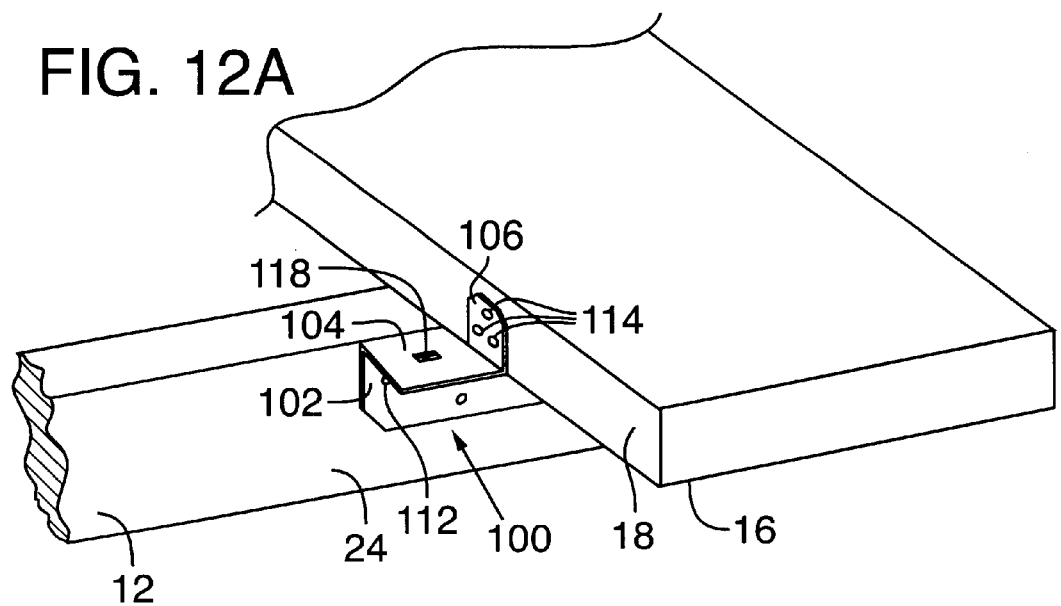
FIG. 12A is a partial perspective view showing the bracket of the first embodiment in use in a heel tie-down configuration.
Figure 12B:
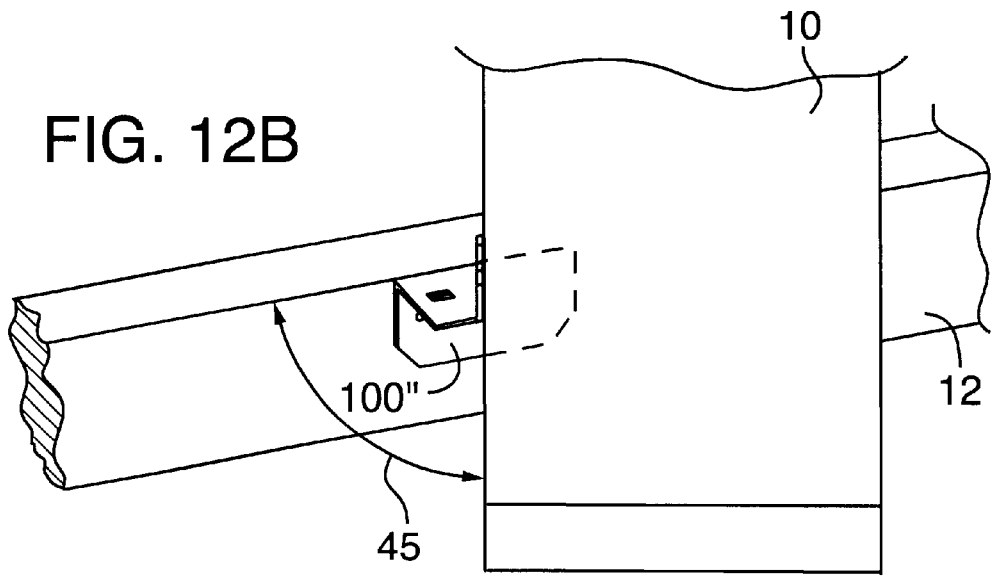
FIG. 12B is a partial perspective view showing the bracket of the first in use in a heel tie-down configuration for a herringbone deck.

In FIG. 12, the bracket 100 is illustrated in the heel tie-down configuration to secure the board 10 to the stringer 12. The bracket 100 is positioned such that the A flange is secured to a side surface 24 of the stringer 12 with screws or nails extending through the A apertures 112 (the left and center apertures 112 being shown in the figure). The C flange is secured to the rear face 18 of the board 10 with screws or nails extending through the C apertures 114. The B flange 104 is thus positioned in a plane approximately parallel to a contact region between the stringer 12 and the board 10. When the board 10 is flat against the stringers 12, the engaging features 116 of each of the brackets 100 attached to the stringers 10 will engage the lower side 16 of the board 10. Optionally, the push out 118 (or a fastener driven through the aperture 118') can be used to engage a lower side of a second board (not shown) placed adjacent and leftward of the board 10.

With the C flange 106 securely screwed to the rear face 18, the C flange 106 serves as a minimal but consistent spacer between the first board 10 and the second board placed adjacent the first board 10 and against the C flange 106. In typical use with a number of stringers 12 and a corresponding number of brackets 100, adjacent boards are uniformly spaced by about the thickness of the C flange 106 of the bracket 100 (and any additional amount by which the screws or nails securing the C flange 106 may protrude).

In FIG. 13, the bracket 100 is illustrated as installed in the toe cleat configuration on the lower side 16 of inverted board 10, prior to final assembly. In the toe cleat configuration, the C flange 106 is screwed or nailed to the forward face 20 of the board 10 with the B flange 104 flat against the lower side 16. Optionally, the B flange 104 may be secured to the lower side 16 using the attachment feature 118 or 118' as described above. The A flange projects upward from the lower side 16. A portion of the A flange also projects outward from the forward face 20. In a specific implementation, the projecting portion is approximately half of the length of the A flange.

Figure 14:
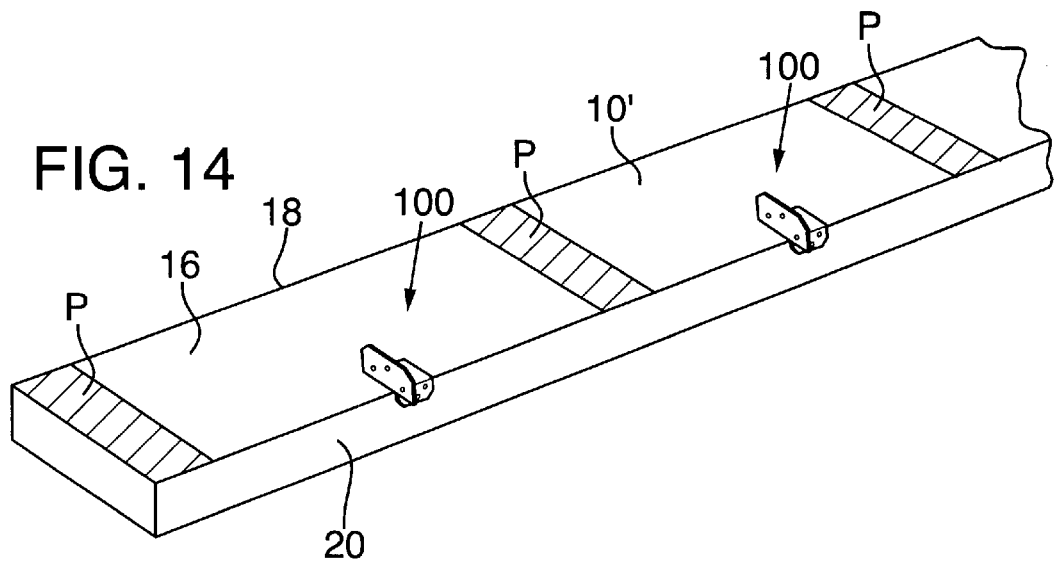
FIG. 14 is a partial perspective view of the underside of a board on which several brackets have been installed in the toe cleat configuration, showing the positioning of the brackets relative to the positions of the stringers.

In FIG. 14, three such brackets 100 in the toe cleat configuration are shown on the board 10', prior to final assembly. As illustrated, each of the brackets 100 in this configuration is spaced approximately midway between where adjacent stringers will intersect with the board, as indicated by the shaded portions P in the figure. However, where the supporting stringers are spaced at greater intervals, it may be beneficial to use multiple brackets between adjacent stringers.

Figure 15:
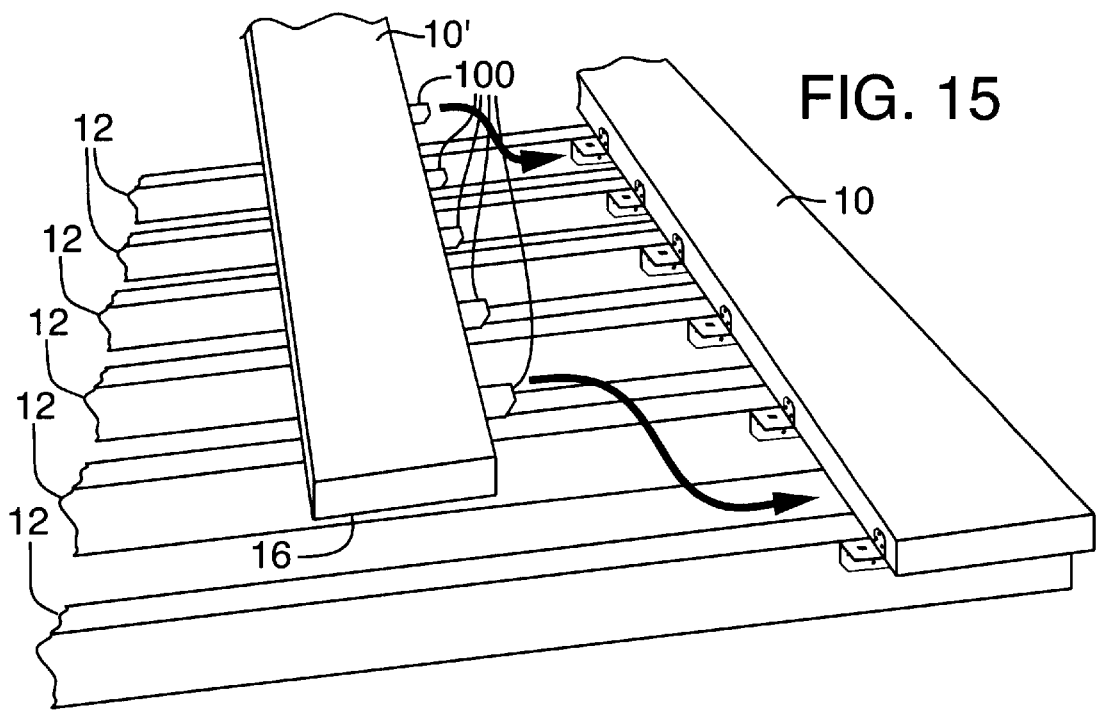
FIG. 15 is a partial perspective view showing a first board secured in place with the brackets in the heel tie-down configuration and a second board according to FIG. 14 being installed adjacent the first board.

FIG. 15 shows the final assembly of the board 10' shown in FIG. 14 (with the brackets 100 in the toe cleat configuration) together with another board 10 attached to a series of stringers 12 . As illustrated, the board 10 has been secured to each of the stringers 12 with brackets 100 in the heel tie-down configuration, as in FIG. 12.

The board 10' is shown being tilted slightly as it is slid into place adjacent board 10, such that the projecting A flange portion of each bracket 100 attached to board 10' will pass beneath the lower side 16 of board 10. When board 10' is flat against the stringers 12, the engaging features 116 of each of the brackets 100 attached to board 10' will engage the lower side 16 of board 10.

With the C flange 106 securely screwed to the forward face 20 of the board 10', the C flange 106 serves as a minimal but consistent spacer between the first board 10 and the second board 10' placed adjacent the first board 10 and against the C flange 106. In typical use with a number of stringers 12 and a corresponding number of brackets 100, adjacent boards are uniformly spaced by about the thickness of the C flange 106 of the bracket 100 (and any additional amount by which the screws or nails securing the C flange 106 may protrude).

In the exemplary implementations described above, the bracket is described in connection with a structure, such as, e.g., a deck, having at least one board that is attached to a supporting member, e.g., a stringer. In the illustrated implementations, the board is one of several similar boards that are arranged horizontally such that their faces (i.e., the narrower dimension of the board) are adjacent and parallel to each other, with the adjacent top and bottom sides (i.e., the wider dimension of the board) forming an approximately flat and horizontal finished surface.

Of course, the bracket may be used where the resulting finished surface is not oriented horizontally. Also, the bracket may be used with square boards in which the faces and sides have approximately the same dimension. The bracket may also be used in applications where the finished surface is formed from adjacent faces of the boards (i.e., where the boards contact the supporting members at their opposite faces).

In the illustrated implementations, the supporting members are spaced from each other horizontally and positioned transverse to the boards such that the bottom sides of the boards are placed on the upper faces of the supporting members. It is also possible to orient the supporting members such that the boards are supported by the sides of the supporting members. Alternatively, the supporting members may also be square, in which case the sides and faces are of approximately equal length.

The bracket is readily fabricated from a variety of metals such as steel, brass, copper, or aluminum. The bracket may also be fabricated from a variety of thermoplastic and thermosetting synthetic resinous materials such as fiber reinforced phenolics, glass fiber reinforced nylon and polypropylene. The bracket can be manufactured by stamping, bending, casting, machining, welding, molding and other such processes commonly known to those skilled in the art. Construction of metal such as 18 gauge galvanized steel stock by stamping and subsequent bending processes is preferred for economy. The bracket can also be painted, plated, or subjected to other types of surface treatment (e.g., for aesthetic reasons or to resist weather conditions). The brackets nest together, such that a number of brackets can be easily carried, stored, or packaged for sale.

Having illustrated and described the principles of my invention with reference to several preferred embodiments, it should be apparent to those of ordinary skill in the art that the invention may be modified in arrangement and detail without departing from such principles. I claim as my invention all such modifications that fall within the scope of the following claims.

I claim:

1. A flanged bracket for use with fasteners to attach at least one spanning member to at least one supporting member extending transverse to the spanning member, the bracket-comprising:

a first flange;

a second flange extending approximately perpendicular from the first flange; and a third flange extending approximately perpendicular from the second flange;

wherein, with a side of the spanning member touching a supporting face of the transverse supporting member and defining a contact area therebetween, the bracket is positionable such that the first flange can be attached to a side of the supporting member, and the third flange can be attached to a face of the spanning member, the second flange extending between the first and third flanges in a plane approximately parallel to the contact area between the spanning member and the supporting member, wherein the first, second, and third flanges are mutually perpendicular to each other and the first flange and the third flange occupy respective planes that intersect at an acute angle.

2. The bracket of claim 1 wherein the first flange includes at least one engagement feature projecting beyond the plane of the second flange allowing an edge of the first flange to engage a side of an adjacent spanning member.

3. The bracket of claim 1 wherein the first and third flanges each includes a plurality of apertures sized to receive fasteners.

4. The bracket of claim 1 wherein the first and third flanges each includes a plurality of indicia.

5. The bracket of claim 1 wherein the second flange includes an aperture.

6. The bracket of claim 1 wherein the second flange includes an engagement feature allowing the second flange to be attached to an adjacent surface by punching or pressing the feature into the surface.

7. The bracket of claim 1 wherein a space separates the third flange from an adjoining edge formed by an intersection of the first and second flanges.

8. The bracket of claim 1 wherein the first flange is longer than the second flange such that a first flange edge extends beyond an adjoining second flange edge.

9. The bracket of claim 1 wherein non-adjoining corners of the first and third flanges are beveled.

10. The bracket of claim 1 wherein said first flange, said second flange and said third flange each define at least one aperture therein.

11. A dual-mode bracket for use in assembling component pieces of a structure having spanning members that extend approximately perpendicular to spaced supporting members, the spanning members having supported sides in contact with supporting faces of the supporting members, the bracket comprising:

a first flange;

a second flange extending approximately perpendicular from the first flange; and a third flange extending approximately perpendicular from the second flange;

wherein, in a first heel tie-down mode, the bracket is positionable such that the first flange can be attached to a side of one of the supporting members, and the third flange can be attached to an edge of one of the spanning members to secure the spanning member and the supporting member together;

wherein, in a second toe cleat mode, the bracket is positionable at a point on the spanning member between adjacent supporting members such that the third flange is adjacent a face of the spanning member, the second flange is adjacent the supported side of the spanning member, and the third flange extends beyond the face of the spanning member to a point adjacent the supported side of an adjacent spanning member, wherein the first flange has at least one engagement feature projecting beyond the plane of the second flange allowing an edge of the first flange to engage an adjacent surface.

12. The bracket of claim 11, wherein the second flange has at least one engagement feature allowing the second flange to be engaged with an adjacent surface.

13. The bracket of claim 11, wherein the third flange operates as a spacing member to separate a pair of adjacent spanning members by a predetermined distance.

14. The bracket of claim 11, wherein a space separates an edge of the third flange from an adjoining edge between the first and second flanges.

15. The bracket of claim 11, wherein in the second mode, the second flange is attached with fasteners to the side of the spanning member.

16. The bracket of claim 11, wherein in the second mode, the third flange is attached with fasteners to the face of the spanning member.

17. The bracket of claim 11, wherein non-adjoining corners of the first, second and third flanges are beveled.

18. In an assembly of at least one spanning member extending transverse to and in contact with at least one supporting member, the spanning member and supporting member being secured by a bracket;

the supporting member having a first supporting face and a first side substantially perpendicular to the supporting face and forming a first edge with the supporting face;

the spanning member having a supported side and a second face substantially perpendicular to the supported side and forming a second edge with the supported face, the first edge and second edge defining an intersection;

a flanged bracket attached to the spanning member and to the supporting member, the bracket having a first flange, a second flange extending approximately perpendicular from the first flange, and a third flange extending approximately perpendicular from the second flange;

wherein the first, second, and third flanges are mutually perpendicular to each other and the first flange and the third flange occupy respective planes that intersect at an acute angle;

wherein the first flange is attached to the first side of the supporting member, and the third flange is attached to the second face of the spanning member, the second flange extending between the first and third flanges approximately parallel to a contact area between the spanning member and the supporting member.

* * * * *